H. Tilden,
Flour Sieve.
Nº 47,756.          Patented May 16, 1865.
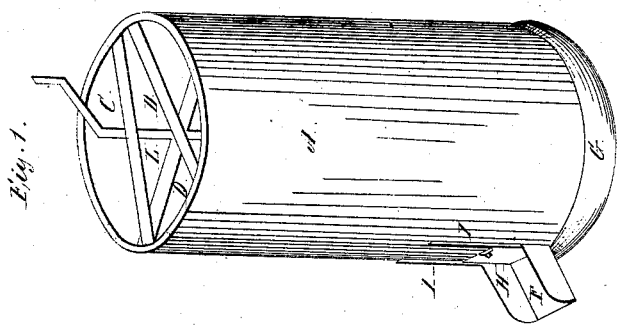
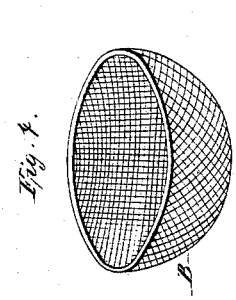
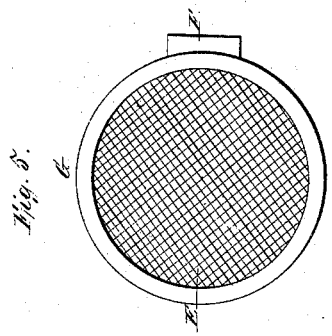
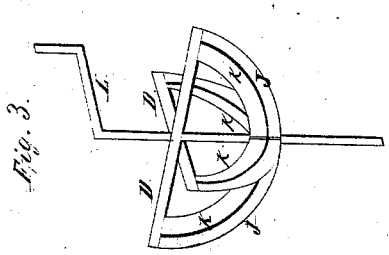
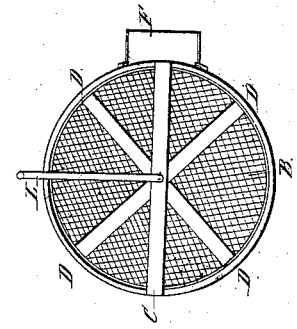
Witnesses:
Joseph H. Littlefield
F. T. Cushing
Inventor:
Howard Tilden

UNITED STATES PATENT OFFICE.

HOWARD TILDEN, OF PHILADELPHIA, PENNSYLVANIA.

IMPROVED FLOUR-SIFTER.

Specification forming part of Letters Patent No. 47,756, dated May 16, 1865.

*To all whom it may concern:*

Be it known that I, HOWARD TILDEN, of Philadelphia, in the county of Philadelphia and State of Pennsylvania, have invented new and useful Improvements in Flour-Sifters for Family Use; and I do hereby declare the following to be a full and exact description of the same, reference being had to the drawings which accompany and form a part of this specification, in which—

Figure 1 is a perspective view of the side. Fig. 2 is a plan top view, looking down onto the sieve. Fig. 3 is a perspective view of the interior revolving part, showing the shaft, crank, scrapers, and their connections. Fig. 4 is a perspective view of the wire-cloth forming a sieve, which the flour passes through. Fig. 5 is a plan view of the under side, showing the recessed bottom and the flaring portion of the outside case, forming a base, which the article sits on.

The same letters on the drawings represent corresponding parts in the different figures.

To enable others skilled in the art to make and use my invention, I will describe its construction and mode of operation.

I make the case A and all other parts of tin, excepting the sieve B and the shaft and crank L; the sieve B of wire-cloth, either brass or iron, and the shaft and crank *l* of large iron or brass wire.

A represents a circular case open at the top to receive the flour.

B represents the sieve which the flour is forced through by the friction of the scrapers J J.

C represents a horizontal cross-beam connected with the case A at each end, on which the shaft *l* is supported.

D D represent the two horizontal cross-arms by which the radial arms K K K are connected and supported.

E represents the bottom which prevents the flour from dropping through the case A.

F represents a spout through which the flour is conducted from the case A when it may be necessary for use.

G represents a flaring base, forming the bottom of the case A.

H is a slide, which, when opened, lets the flour into the spout F.

I I is two flanges of tin soldered to the case A, forming a groove, holding the slide H in its place.

J J represent narrow curved pieces of rubber cut to fit the form of the sieve B, connected with the radial arms K K K, forming scrapers by which the flour is forced through the sieve B.

K K represent four radial arms connecting with the cross-arms D D, &c., and supporting the rubber scrapers J J J.

L represents the shaft and crank by which the horizontal cross-arms D D, radial arms K K, rubber scrapers J J J are revolved, forcing the flour through the sieve B.

What I claim, and desire to secure by Letters Patent, is—

The combination of the case A, the concave seive B, the cross-beam C, the horizontal cross-arms D D, bottom E, spout F, base G, slide H, flange I, the rubber scrapers J J J J, radial arms K K K K, the shaft and crank L, as and for the purpose set forth.

HOWARD TILDEN.

Witnesses:
JABEZ A. SAWYER,
JOHN BUCHLEY.